March 15, 1960     W. M. HAWKINS, JR     2,928,238
JET DEFLECTOR AND ORIFICE CONTROL
Filed June 8, 1953     3 Sheets-Sheet 1

INVENTOR.
WILLIS M. HAWKINS JR.
BY
Agent

March 15, 1960  W. M. HAWKINS, JR  2,928,238
JET DEFLECTOR AND ORIFICE CONTROL
Filed June 8, 1953  3 Sheets-Sheet 2
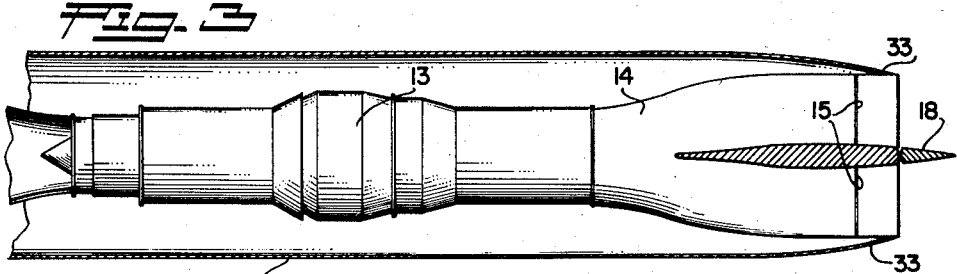
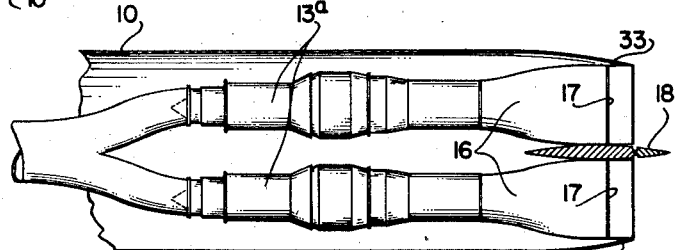
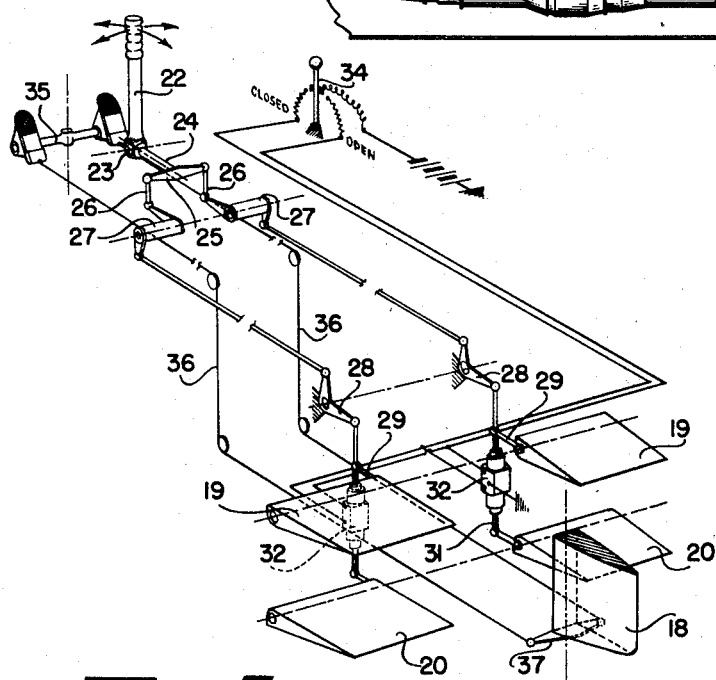
INVENTOR.
WILLIS M. HAWKINS JR.
BY
Agent March 15, 1960 W. M. HAWKINS, JR 2,928,238
JET DEFLECTOR AND ORIFICE CONTROL
Filed June 8, 1953 3 Sheets-Sheet 3
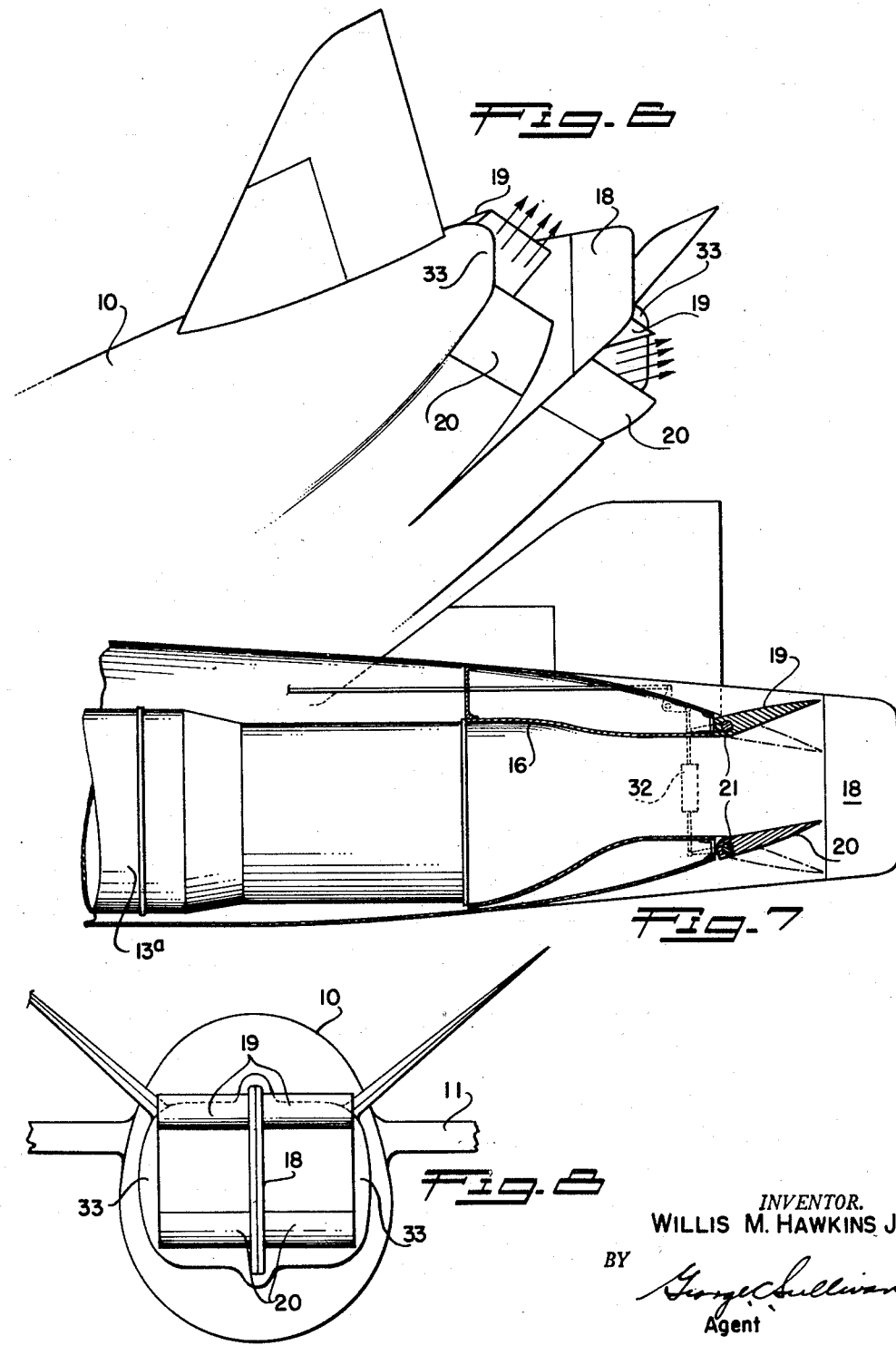
INVENTOR.
WILLIS M. HAWKINS JR.
BY
Agent

United States Patent Office 2,928,238
Patented Mar. 15, 1960

2,928,238

JET DEFLECTOR AND ORIFICE CONTROL

Willis M. Hawkins, Jr., North Hollywood, Calif., assignor to Lockheed Aircraft Corporation, Burbank, Calif.

Application June 8, 1953, Serial No. 360,241

1 Claim. (Cl. 60—35.54)

This invention relates to directional and thrust control of the discharge jet or exhaust from turbo jet powerplants to provide various combinations of directional pitch and rolling controls for the airplane itself, to aid and/or replace conventional aerodynamic control surfaces.

It has heretofore been proposed to vary the orifice area of turbo jet exhaust pipes to adjust the thrust of the powerplant, especially when the turbo jet is equipped with an afterburner in the tail pipe. This has been done by using so-called adjustable eye lids at the end of the tail pipe, such eye lids resembling clam shell doors which retract over the outside of the tail pipe when not in use. My invention is directed to coupled deflecting vanes defining the upper and lower boundaries of the jet stream issuing from the tail pipes, the deflection of these vanes in turn producing a deflection of the jet stream with a consequent reaction or pressure on one or both of the vanes providing control of the aircraft, while the coupling between the vanes is separately adjustable to vary the exit area of the jet to control the thrust of the powerplant.

It is a further object of this invention to provide twin jet tail pipes for one or more power plants, having jet deflectors operated in unison for pitch control and differentially for roll control to supplement or replace the normal aerodynamic control surfaces, a rudder deflector between the twin jets being used for yaw control. Such an arrangement is particularly useful in connection with convertiplanes, as for hovering control, when aerodynamic forces acting on conventional control surfaces are lacking or of small moment thus requiring oversize control surfaces that increase the drag on the airplane at normal flight speeds.

A further object of this invention is to provide an adjustable control means for a turbo jet powered airplane which serves as a discharge nozzle control means for the powerplant, as well as a thrust diverter for directional pitch and rolling control for the airplane.

Other and further objects of this invention will become apparent from the following detailed description and drawings of an embodiment chosen for illustrative purposes wherein:

Figure 3 is a plan view of an arrangement of twin tail pipes connected to a single powerplant;

Figure 4 is a plan view of a twin powerplant and tail pipe arrangement;

Figure 5 is a perspective view of the control linkage for operating the exhaust deflectors;

Figure 6 is a perspective view of a V-tail airplane showing differential deflection of the vanes controlling the tail pipes, as used to produce a rolling moment of the airplane;

Figure 7 is a vertical longitudinal section of one tail pipe of Figure 6 showing operation of the vanes for thrust deflection;

Figure 8 is a rear view of the twin tail pipes and their controlling vanes.

As shown on the drawings:

Figures 1, 2:
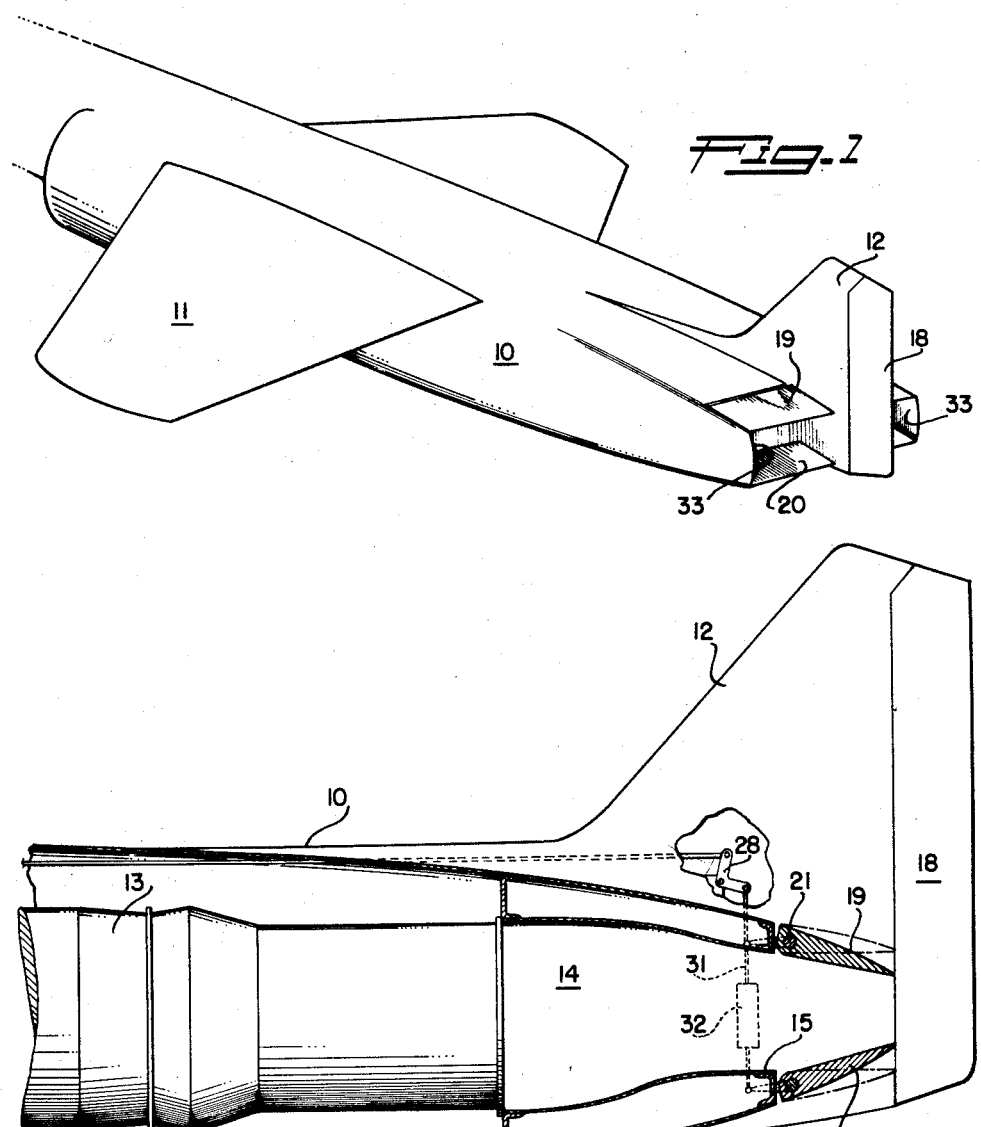
Figure 1 is a perspective view of the tail of an airplane embodying twin tail pipes controlled by deflector vanes in accordance with my invention.
Figure 2 is a longitudinal cross-section through one of the twin tail pipes of Figure 1 showing operation of the vanes for thrust control.

The rear portion of a conventional airplane fuselage 10 together with wings 11 and vertical stabilizer 12 are shown in Figure 1 to illustrate a twin tail pipe installation incorporating either a single turbo jet 13 as in Figure 3 or dual turbo jet powerplants 13a as in Figure 4. In Figure 3 the jet engine is connected to a bifurcated tail pipe 14 terminating in substantially rectangular orifices 15, while in Figure 4 both tubo jet powerplants have tail pipes 16 terminating in substantially rectangular orifices 17. In both arrangements a central rudder or yaw vane 18 is pivoted to the rear of and between the orifices 15 and 17 and serves to deflect one or the other jet stream from said orifices away from the longitudinal axis of the direction of pivotal movement of the vane. It will be noted, see Figures 1, 3 and 4, that the stabilizer 12 provides fixed walls or side plates at the inboard margins of the orifices 15 and 17.

Each of the twin rectangular jet orifices has deflection vanes 19 and 20 hinged at 21 to the upper and lower edges. The upper and lower vanes associated with each orifice are intended to be operated either in unison or differentially for pitch and roll control respectively by moving the vanes into jet deflecting positions, Figure 7 illustrating an upward deflection of the vanes. A suitable pilot's control stick 22 for operating the vanes is shown in Figure 5, it being understood that this stick may also operate conventional aerodynamic control surfaces in the usual manner. The stick 22 is pivoted at 23 at its base and has an extension arm 24 carrying a cross member 25 at its end, with links 26 from the ends of the cross member operating offset bell cranks 27 each of which is separately connected to bell cranks 28 in turn linked to operating horns 29 for the upper vanes 19. With this arrangement, fore and aft movement of the control stick 22 results in simultaneous downward or upward movements of the deflecting vanes 19. Such downward movement of the vanes 19 produces a diving moment on the airplane. Upward movement of the vanes 19 pulls the lower vanes 20 up through links 31 to deflect the jets upwardly as in Figure 7 to produce a climbing moment on the airplane. Thus fore and aft movement of the pilot's control stick 22 produces simultaneous deflections of the vanes 19 and 20 in the same direction. Sideways movement of the stick 22 moves one bell crank 27 upwardly and the other downwardly to move the vanes 19 and 20 on one tail pipe upwardly and the other pair of vanes downwardly to produce a rolling couple from the resulting oppositely deflected jets.

The links 31 interconnecting the operating horns of each pair of vanes 19 and 20 incorporate reversible electrically operated extensors 32 which serve to adjust the pairs of vanes 19 and 20 to vary the orifice area at the trailing edges thereof for most effective powerplant operation. Figure 2 illustrates this orifice change for thrust control. To render such adjustment effective, fixed side plates 33 are provided along side the outboard edges of the vanes, the stabilizer 12 forming a wall or plate at the inboard edges of the vanes. The extensors are operated by a reversing lever operated switch 34 which may be conveniently located near or connected to the engine throttle lever or fuel control system (not shown) in order to tie in the orifice thrust control with the operation of the turbo powerplant. Sidewise escape of the propulsive gases from between the vanes 19 and 20 is prevented by side plates 33 which render the area controlling action of the vanes 19 and 20 fully effective for thrust control.

Figure 5 also shows a foot operated rudder bar 35 linked by cables 36 to a yoke 37 carried by the rudder vane 18 for the manipulation of the latter.

In the operation of the controls of this invention, which may be used to supplement or replace conventional aerodynamic control surfaces, it will be understood that during the initial period of a take-off run, and the final stages of a landing run, conventional aerodynamic control surfaces are not subjected to sufficient air flow and aerodynamic forces for adequate control of the aircraft. Also in airplanes designed for direct vertical take-off and hovering the airflow over aerodynamic control surfaces is again inadequate to give proper control of the airplane attitude or direction. Under such conditions of operation the turbo jet propulsive arrangement is operating at substantially full power except perhaps at the end of the landing run, and means to deflect the propulsive jet gives a powerful reaction on the deflecting means which I utilize for yaw, pitch and roll controls. A further advantage of this system is that difficulties with ordinary controls in the transonic and supersonic speed range can be avoided by the use of thrust and deflection for control at these speeds.

By deflecting the horizontally hinged vanes 19 and 20 in unison the effect of a downward movement of an elevator is obtained, and contra, upward movements of these vanes correspond to an upward elevator movement for pitch control. In each case the vanes are not submerged in the jet stream and do not produce a continuous drag thereon, and the external surface of each vane permits the use of external cool air for the cooling of the vanes.

The simultaneous operation of the vanes trailing from each of the twin tail pipe orifices provides for pitching control as described above. If the twin vane arrangements are differentially or oppositely operated, the upward deflection of the jet stream from one tail pipe and the downward deflection of the jet stream from the other tail pipe, as indicated in Figure 6, produces a rolling couple about the airplane longitudinal axis which provides for lateral control. The operation of the vanes by the pilot to produce these results conforms to conventional operation of ailerons and elevators by a control stick or wheel and will be obvious from Figure 5.

The upper and lower vanes 19 and 20 may be adjustably linked together as by electric actuators 32 which can be used to control the thrust of the jet engines by controlling the free discharge from the tail pipe.

To complete the control requirements of an aircraft, a rudder vane 18 is hinged behind and between the tail pipes to deflect one or the other jet streams outboard to produce a yawing effect.

It will thus be seen that I have invented an improved and simplified control system embracing thrust, yaw, pitch and roll, with the three latter components supplementing or replacing conventional aerodynamic control surfaces.

Having thus described my invention and the present preferred embodiments thereof, I desire to emphasize the fact that many modifications may be resorted to in manner limited only by a just interpretation of the following claim.

I claim:

An aircraft propulsion and directional control system comprising power plant means producing a propulsive jet stream, a tail pipe conducting said stream rearwardly and terminating at its aft end in a rectangular shape, a fixed stabilizer bifurcating said tail pipe and extending therebeyond at the aft end thereof and forming two orifices at the aft end thereof, a rudder vane mounted on the stabilizer at the aft end thereof beyond said orifices, said rudder vane being pivotally mounted for rotational movement about a vertical axis, a set of deflection vanes pivotally mounted on the upper and lower edges of each of said orifices for rotational movement about horizontal axes, the aft end of said deflection vanes being substantially coterminous with the aft end of said stabilizer, fixed side plates rigidly fixed to the aft end of said tail pipe on the outboard edges thereof and extending rearwardly therefrom, a remotely controlled adjustable length link interconnecting the vanes of each set of deflection vanes to pivot them relative to one another, said links at each orifice being preadjusted to form equal effective openings in said orifices, control means interconnecting said adjustable length links for simultaneous actuation thereof to maintain the effective area of each orifice substantially equal, lever means effecting translational movement of the link connecting the deflection vanes at each orifice to selectively pivot the deflection vanes associated with one orifice in the same or in the opposite direction to the vanes associated with the other orifice to provide pitch and roll control for the aircraft, and means operable to pivot said rudder vane to deflect the jet issuing from the orifice provide yaw control.

References Cited in the file of this patent

UNITED STATES PATENTS

| 2,470,348 | Haight | May 17, 1949 |
| 2,664,700 | Benoit | Jan. 5, 1954 |

FOREIGN PATENTS

| 427,017 | Great Britain | July 10, 1933 |
| 449,148 | Great Britain | Sept. 14, 1934 |
| 580,995 | Great Britain | Sept. 26, 1946 |